(12) United States Patent
Suzuki et al.

(10) Patent No.: US 10,883,608 B2
(45) Date of Patent: Jan. 5, 2021

(54) DISC BRAKE AND PISTON BOOT

(71) Applicant: HITACHI AUTOMOTIVE SYSTEMS, LTD., Ibaraki (JP)

(72) Inventors: Shinji Suzuki, Minami-Alps (JP); Shiro Nagashima, Kai (JP); Syunsuke Aoki, Saitama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 76 days.

(21) Appl. No.: 15/998,957

(22) PCT Filed: May 26, 2017

(86) PCT No.: PCT/JP2017/019693
§ 371 (c)(1),
(2) Date: Aug. 17, 2018

(87) PCT Pub. No.: WO2017/204329
PCT Pub. Date: Nov. 30, 2017

(65) Prior Publication Data
US 2020/0141498 A1   May 7, 2020

(30) Foreign Application Priority Data

May 27, 2016   (JP) ................ 2016-106416

(51) Int. Cl.
| F16J 15/52 | (2006.01) |
| F16D 65/18 | (2006.01) |
| F16J 3/04 | (2006.01) |
| B60T 1/06 | (2006.01) |
| F16D 121/02 | (2012.01) |

(52) U.S. Cl.
CPC .............. *F16J 15/52* (2013.01); *F16D 65/18* (2013.01); *F16J 3/042* (2013.01); *B60T 1/065* (2013.01); *F16D 2121/02* (2013.01)

(58) Field of Classification Search
CPC .. F16J 15/52; F16J 15/525; F16J 3/042; F16J 3/00; F16J 3/02; F16D 65/18;
(Continued)

(56) References Cited

U.S. PATENT DOCUMENTS

| 5,048,648 A | 9/1991 | Le Deit | |
| 2004/0026194 A1* | 2/2004 | Cortinovis | ............... F16J 3/043 |
| | | | 188/218 A |

(Continued)

FOREIGN PATENT DOCUMENTS

| FR | 2685749 A2 | 7/1993 |
| JP | 2860406 B | 2/1999 |

(Continued)

OTHER PUBLICATIONS

Chinese Office Action received in corresponding Chinese Application No. 201780011805.8 dated Aug. 28, 2019.

(Continued)

*Primary Examiner* — Nathan Cumar
(74) *Attorney, Agent, or Firm* — Mattingly & Malur, PC

(57) ABSTRACT

A piston boot has an annular fitting section which is formed on one end side of a bellows section, encloses an annular metallic member and is fitted to a stepped section. The fitting section has an outer peripheral surface section which comes into contact with an inner peripheral surface of the stepped section, and an annular plane section which comes into contact with an annular wall surface section of the stepped section. A plurality of holes each having a bottom surface at a position of the metallic member or a position near the metallic member are opened to the plane section.

6 Claims, 6 Drawing Sheets

(58) Field of Classification Search
CPC ...... F16D 65/16; F16D 65/183; F16D 65/186; F16D 2121/04; F16D 2121/06; B60T 1/062; B60T 1/00
USPC .......................................................... 277/634
See application file for complete search history.

(56) References Cited

U.S. PATENT DOCUMENTS

| | | | |
|---|---|---|---|
| 2006/0118369 A1* | 6/2006 | Fischer | F16D 65/183 188/218 XL |
| 2013/0192936 A1* | 8/2013 | Scotti | F16D 55/228 188/72.4 |
| 2015/0084287 A1* | 3/2015 | Kanagawa | F16C 11/0619 277/635 |
| 2016/0186827 A1* | 6/2016 | Jungmann | F16D 65/18 188/71.9 |

FOREIGN PATENT DOCUMENTS

| | | |
|---|---|---|
| JP | 2009-019643 A | 1/2009 |
| JP | 2014-126193 A | 7/2014 |

OTHER PUBLICATIONS

International Search Report of PCT/JP2017/019693 dated Aug. 22, 2017.

* cited by examiner

DISC BRAKE AND PISTON BOOT

TECHNICAL FIELD

The present invention relates to a disc brake and a piston boot.

Priority is claimed on Japanese Patent Application No. 2016-106416, filed May 27, 2016, the content of which is incorporated herein by reference.

BACKGROUND ART

In a disc brake, a piston boot having a structure in which an annular metallic member is buried in an elastic body is sometimes used as a piston boot installed between a piston and a cylinder (for example, refer to Patent Document 1).

CITATION LIST

Patent Literature

[Patent Literature 1]
Japanese Unexamined Patent Application, First Publication No. 2009-19643

SUMMARY OF INVENTION

Technical Problem

The piston boot of the aforementioned structure has a problem in productivity, which may lead to an increase in the cost of the disc brake.

The present invention provides a disc brake and a piston boot capable of suppressing an increase in cost.

Solution to Problem

According to a first aspect of the present invention, a disc brake includes a piston which presses at least one of a pair of pads facing each other on both sides of a disc; a cylinder having a bore section which movably accommodates the piston and has one open end from which a leading end of the piston protrudes, and a stepped section having an inner diameter larger than an inner diameter of the bore section formed on an opening side of the bore section; and a piston boot which is disposed between a leading end side of the piston and the stepped section of the cylinder and has a bellows section capable of expanding and contracting with the movement of the piston, wherein the piston boot has an annular fitting section which is formed on one end side of the bellows section, encloses an annular metallic member and is fitted to the stepped section, the fitting section has an outer peripheral surface section which comes into contact with an inner peripheral surface of the stepped section, and an annular plane section which comes into contact with the annular wall surface section of the stepped section, and a plurality of holes having a bottom surface at a position of the metallic member or a position near the metallic member open to the plane section.

According to a second aspect of the present invention, a plurality of notches that open inward in a disc radial direction and are formed along a disc axial direction may be provided in the fitting section in a part on an inner side in the disc radial direction with respect to the metallic member.

According to a third aspect of the present invention, radially outer positions of the notches may be located at positions of the inner peripheral surface of the metallic member or positions near the inner peripheral surface of the metallic member.

According to a fourth aspect of the present invention, the plurality of holes and the notches may be formed at different positions in a circumferential direction of the fitting section.

According to a fifth aspect of the present invention, a piston boot is disposed between a leading end side of a piston provided in a caliper of a disc brake and a stepped section formed in a cylinder opening of the caliper, and has a bellows section capable of expanding and contracting with movement of the piston, wherein the piston boot has an annular fitting section which is formed on one end side of the bellows section, encloses an annular metallic member and is fitted to the stepped section, the fitting section has an outer peripheral surface section which comes into contact with an inner peripheral surface of the stepped section, and an annular plane section which comes into contact with an annular wall surface section of the stepped section, and a plurality of holes each having a bottom surface at a position of the metallic member or a position near the metallic member open to the plane section.

According to a sixth aspect of the present invention, notches that open to an inner peripheral surface of the fitting section and are recessed outward in the radial direction may be provided in the fitting section between the inner peripheral surface of the fitting section and the metallic member.

According to a seventh aspect of the present invention, radially outer positions of the notches may be located at positions of the inner peripheral surface of the metallic member or positions near the inner peripheral surface of the metallic member.

According to an eighth aspect of the present invention, the plurality of holes and the notches may be formed at different positions in the circumferential direction of the fitting section.

Advantageous Effects of Invention

According to the disc brake and the piston boot described above, an increase in cost can be suppressed.

DESCRIPTION OF EMBODIMENTS

Embodiments will be described below with reference to the drawings.

Figure 1:
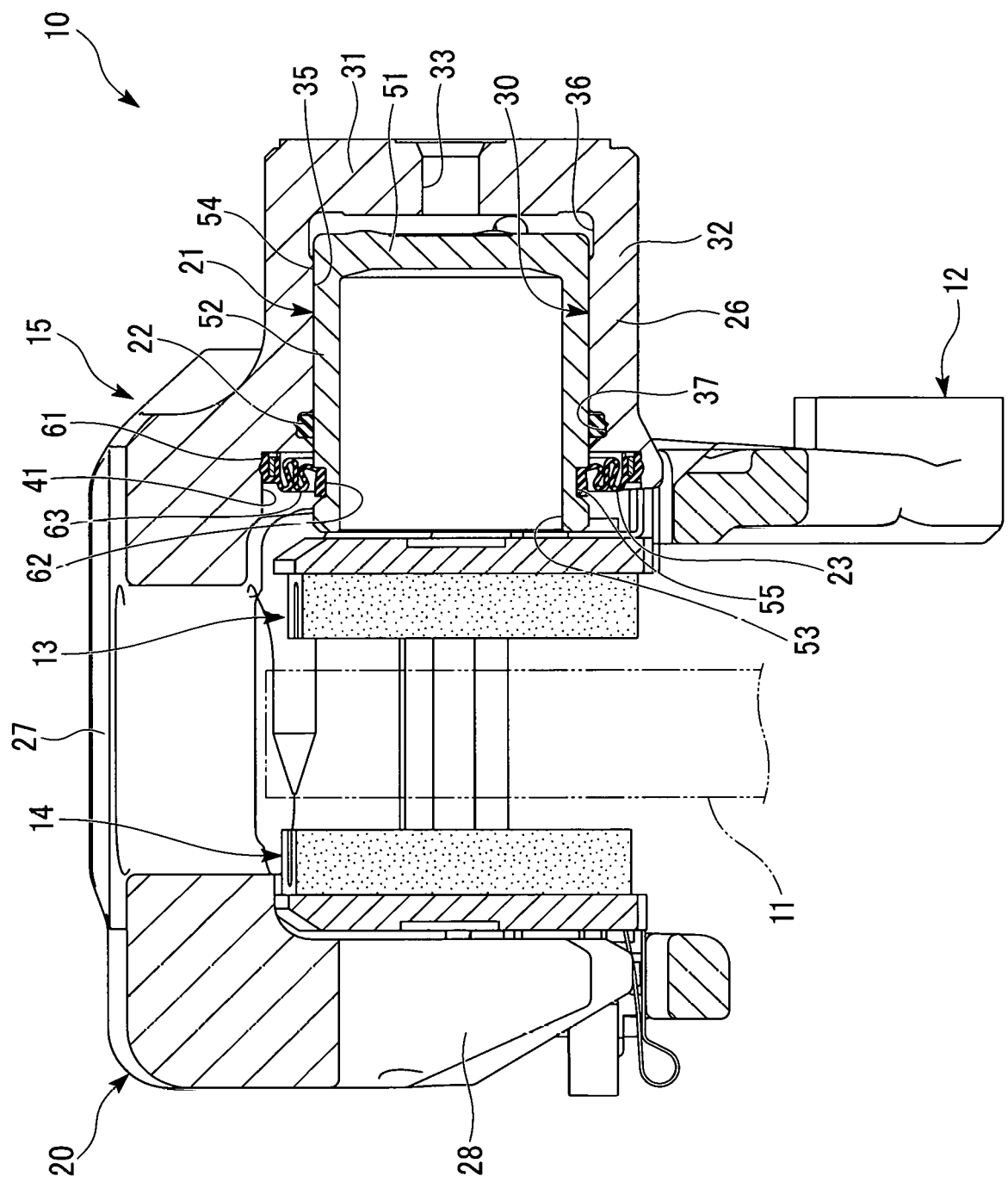
FIG. 1 is a cross-sectional view illustrating a disc brake according to an embodiment of the present invention.

FIG. 1 is a diagram illustrating a disc brake 10. The disc brake 10 is intended for a vehicle such as an automobile, specifically for a four-wheeled automobile. The disc brake 10 brakes the vehicle by stopping the rotation of a disc 11 rotating together with wheels (not illustrated).

The disc brake 10 includes a support member 12, a pair of pads 13 and 14, and a caliper 15. The support member 12 is disposed to straddle an outer peripheral side of the disc 11. The support member 12 is fixed to a non-rotating part of the vehicle. The pair of pads 13 and 14 are supported on the support member 12 to be movable in an axial direction of the disc 11. The pair of pads 13 and 14 are disposed to face both sides of the disc 11. The caliper 15 is supported by the support member 12 to be movable in the axial direction of the disc 11. The caliper 15 clamps the pair of pads 13 and 14 and presses them against both sides of the disc 11.

The caliper 15 has a caliper body 20, a piston 21, a piston seal 22, and a piston boot 23.

The caliper body 20 includes a cylinder 26, a bridge section 27 extending from the cylinder 26 to straddle the outer periphery of the disc 11, and a claw section 28 which extends from the side of the bridge section 27 opposite to the cylinder 26 and faces the cylinder 26.

A bore section 30 having one end opened to the claw section 28 side is formed in the cylinder 26. The bore section 30 accommodates the piston 21 to be movable in the axial direction of the disc 11. By the bore section 30 is formed, the cylinder 26 has a bottom section 31 on the side opposite to the claw section 28, and a cylindrical section 32 extending from an outer peripheral edge portion of the bottom section 31 toward the claw section 28 in a tubular shape.

A through hole 33 for introducing a brake fluid into the bore section 30 is formed in the bottom section 31 of the cylinder 26.

The bore section 30 has a guide inner peripheral surface 35 which is a cylindrical surface for guiding the movement of the piston 21. The bore section 30 has an annular large-diameter groove 36 on the side closer to the bottom section 31 with respect to the guide inner peripheral surface 35. The large-diameter groove 36 has a shape that is recessed outward in the radial direction from the guide inner peripheral surface 35. The bore section 30 has an annular piston seal groove 37 at an intermediate position on the side of the guide inner peripheral surface 35 opposite to the bottom section 31. The piston seal groove 37 has a shape that is recessed outward in the radial direction from the guide inner peripheral surface 35. An inner diameter of the piston seal groove 37 is larger than an inner diameter of the guide inner peripheral surface 35.

An annular stepped section 41 is formed in the cylinder 26 on the side of the claw section 28 which is the opening side of the bore section 30. The stepped section 41 has a shape that is recessed outward in the radial direction from the guide inner peripheral surface 35 of the bore section 30. The stepped section 41 has a stepped shape that passes through toward the claw section 28 side, and is formed at the opening position of the cylinder 26. The inner diameter of the stepped section 41 is larger than the inner diameter of the guide inner peripheral surface 35 of the bore section 30, and is larger than the inner diameters of the piston seal groove 37 and the large-diameter groove 36. That is, the inner diameter of the stepped section 41 is larger than the inner diameter of any position of the bore section 30.

Figure 2:
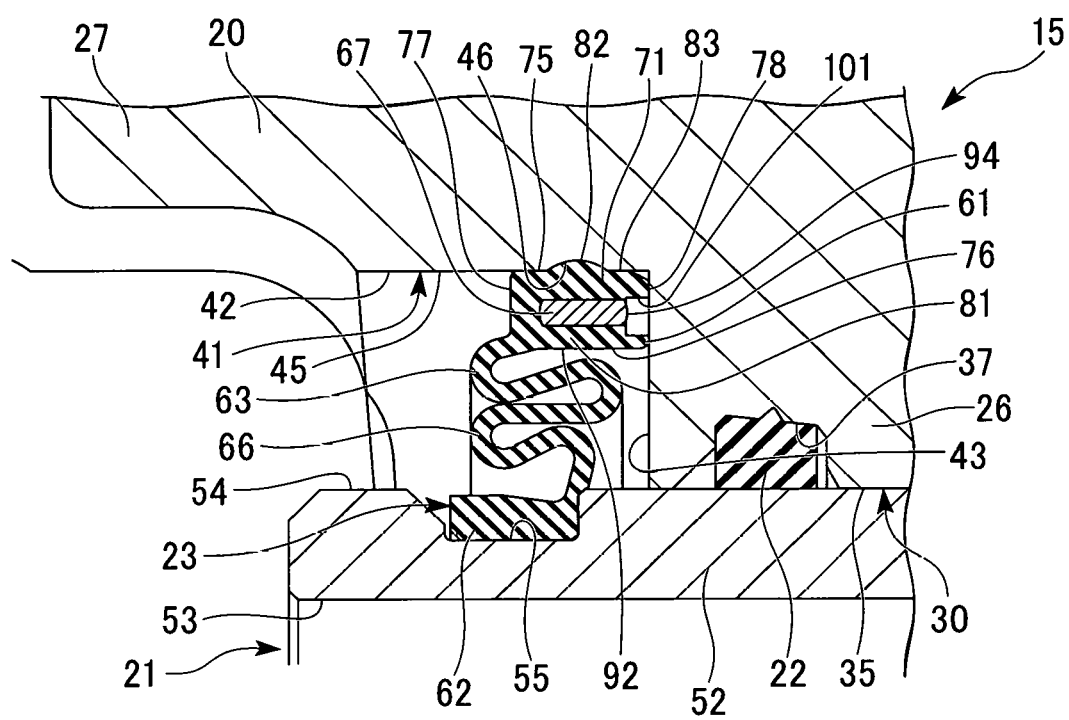
FIG. 2 is a partial cross-sectional view illustrating a disc brake according to the embodiment of the present invention.

The stepped section 41 has a cylindrical inner peripheral surface 42 illustrated in FIG. 2 centered on a central axis of the bore section 30, and a planar annular wall surface section 43 which is orthogonal to the central axis of the bore section 30 on the axial bore section 30 side of the inner peripheral surface 42. An annular engagement groove 46 recessed outward in the radial direction from the main inner peripheral surface 45 formed by the cylindrical surface of the inner peripheral surface 42 is formed in the stepped section 41 at an intermediate position on the annular wall surface section 43 side of the inner peripheral surface 42. The inner peripheral surface 42 of the stepped section 41 includes the main inner peripheral surface 45 and the inner surface of the engagement groove 46. The annular wall surface section 43 is a flat surface orthogonal to the central axis of the bore section 30, and has an annular shape centered on the central axis of the bore section 30.

As illustrated in FIG. 1, the piston 21 includes a bottom section 51 and a cylindrical section 52. The piston 21 is formed in a bottomed cylindrical shape in which an end portion of the cylindrical section 52 on the side opposite to the bottom section 51 is an opening section 53. An annular locking groove 55 is formed on the opening section 53 side of the cylindrical section 52. The locking groove 55 has a shape that is recessed inward in the radial direction from the outer diameter surface 54 formed by the cylindrical surface of the cylindrical section 52. The piston 21 is accommodated in the bore section 30 so that the bottom section 51 is located on the side of the bottom section 31 in the bore section 30. In a state in which the piston 21 is accommodated in the bore section 30, a leading end on the claw section 28 side, that is, the opening section 53 side, protrudes toward the claw section 28 side from the bore section 30. The locking groove 55 is formed in the piston 21 on the leading end side protruding from the bore section 30. That is, the locking groove 55 is disposed outside the bore section 30.

The piston seal 22 is fitted to the piston seal groove 37 of the bore section 30. The piston 21 is fitted to the inner peripheral side of the piston seal 22. The piston seal 22 seals a gap between the cylinder 26 and the piston 21, and supports the piston 21 to be movable in the axial direction with the guide inner peripheral surface 35 of the bore section 30.

The piston boot 23 is disposed between the locking groove 55 on the leading end side of the piston 21 provided in the caliper 15 and the stepped section 41 formed at the opening position of the cylinder 26 of the caliper 15.

The piston boot 23 is engaged with each of the locking groove 55 and the stepped section 41. The piston boot 23 covers the outer peripheral portion exposed from the cylinder 26 on the side closer to the bore section 30 of the locking groove 55 of the piston 21.

The piston boot 23 has an annular large-diameter fitting section 61 (fitting section) fitted to the stepped section 41 of the cylinder 26, an annular small-diameter fitting section 62 fitted to the locking groove 55 of the piston 21, and a bellows section 63 capable of expanding and contracting between them. In other words, the large-diameter fitting section 61 is formed at one end side of the bellows section 63, and the small-diameter fitting section 62 is formed at the other end side of the bellows section 63. In other words, in the piston boot 23, the large-diameter fitting section 61 is formed on one end side, the small-diameter fitting section 62 is formed on the other end side, and the bellows section 63 is formed in an intermediate section.

Figure 3:
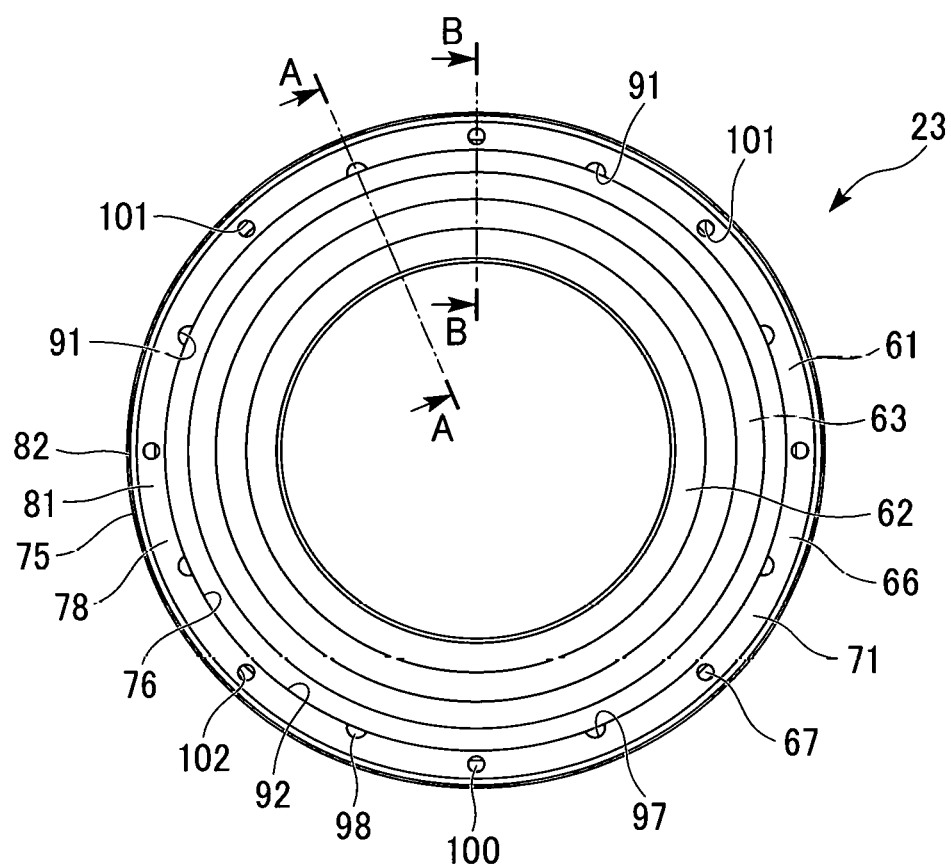
FIG. 3 is a rear view illustrating a piston boot according to the embodiment of the present invention.

Both the large-diameter fitting section 61 and the small-diameter fitting section 62 have an annular shape as illustrated in FIG. 3. As illustrated in FIG. 2, both inner and outer diameters of the small-diameter fitting section 62 are smaller than those of the large-diameter fitting section 61. The inner peripheral portion of the small-diameter fitting section 62 is fitted into the locking groove 55 of the piston 21. An outer peripheral portion of the large-diameter fitting section 61 is fitted into the stepped section 41 of the cylinder 26. The large-diameter fitting section 61 of the piston boot 23 is fixed to the cylinder 26. In this fixed state, in the piston boot 23 in which the small-diameter fitting section 62 is fixed to the piston 21, an intermediate bellows section 63 not fixed to the cylinder 26 and the piston 21 expands and contracts with movement of the piston 21 with respect to the cylinder 26.

Figure 4:
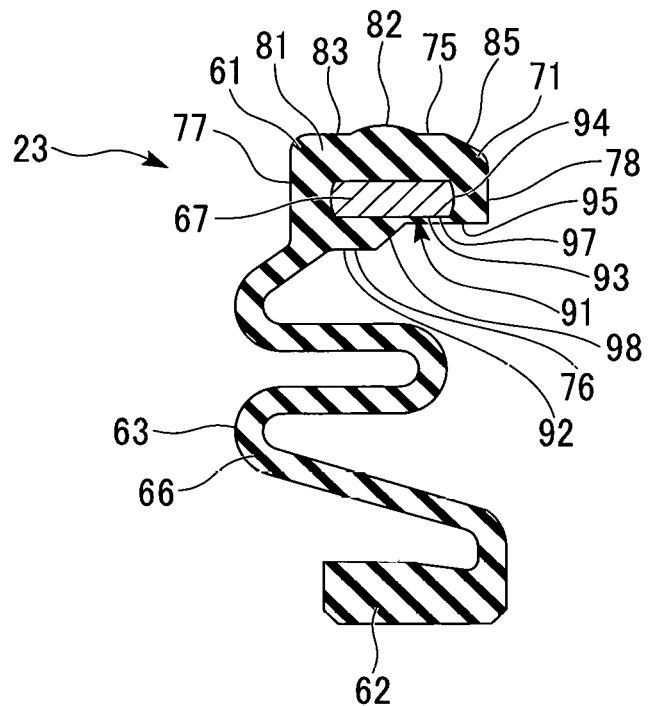
FIG. 4 is a cross-section at A-A of FIG. 3.
Figure 5:
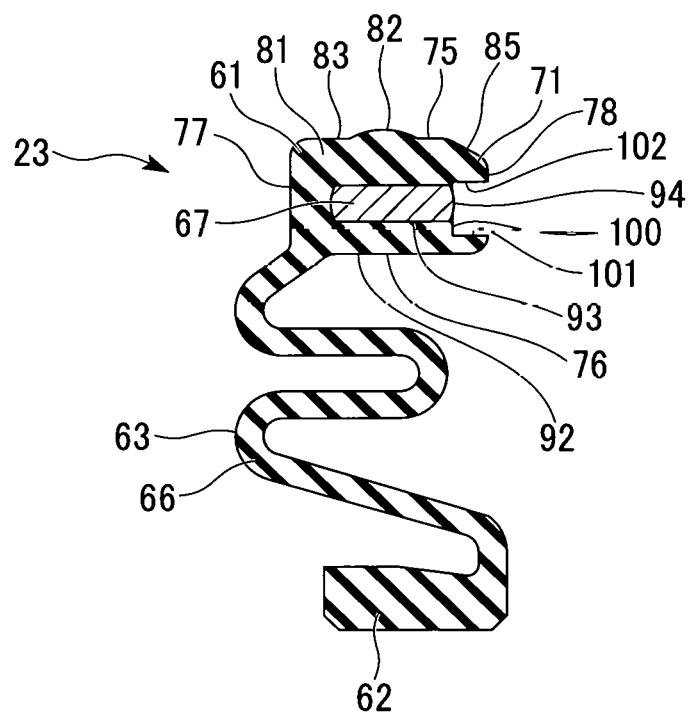
FIG. 5 is a cross-section at B-B of FIG. 3.

The piston boot 23 is formed by embedding an annular metallic member 67 in an annular elastic member 66 made of rubber. The metallic member 67 is higher in rigidity than the elastic member 66, and is harder to deform than the elastic member 66. As illustrated in FIGS. 4 and 5, the metallic member 67 is a cylindrical body that a length in the axial direction is longer than the thickness in the radial direction. The metallic member 67 is enclosed in the above-described large-diameter fitting section 61. The large-diameter fitting section 61 is formed in a cylindrical shape by the whole of the metallic member 67 and the elastic member forming section 71 which is a part of the elastic member 66. The bellows section 63 is formed in a bellows shape only with the elastic member 66. The small-diameter fitting section 62 is formed into a cylindrical shape only with the elastic member 66. In the present embodiment, the metallic member 67 is a cylindrical member as described above, but the metallic member 67 may be a polygonal cylindrical member.

The elastic member forming section 71 of the large-diameter fitting section 61 forms the outer part of the large-diameter fitting section 61 and has an annular shape. The metallic member 67 is disposed inside the elastic member forming section 71 in the radial direction and in the axial direction. Although these elastic member forming sections 71 and the metallic member 67 are not adhered to each other, they may be adhered and integrated. The elastic member forming section 71 covers both the inner diameter side and the outer diameter side of the cylindrical metallic member 67, and covers both sides of the metallic member 67 in the axial direction.

The annular large-diameter fitting section 61 has an outer peripheral surface section 75, an inner peripheral surface section 76, a plane section 77 at one end in the axial direction, and a plane section 78 at the other end in the axial direction. The outer peripheral surface section 75 and the inner peripheral surface section 76 have a cylindrical surface shape. The outer peripheral surface section 75 and the inner peripheral surface section 76 are disposed coaxially. Both of the plane sections 77 and 78 are planes orthogonal to the central axis of the large-diameter fitting section 61. All of the outer peripheral surface section 75, the plane section 77, and the plane section 78 of the large-diameter fitting section 61 are the elastic member forming section 71. One end side of the bellows section 63 extends from an end edge portion of the inner peripheral surface section 76 which is the elastic member forming section 71 on the plane section 77 side. The other end side of the bellows section 63 is connected to an end edge portion on one axial side of the inner peripheral surface of the small-diameter fitting section 62. The connecting side of the bellows section 63 of the small-diameter fitting section 62 and the connecting side of the bellows section 63 of the large-diameter fitting section 61 are opposite sides of the piston boot 23 in the axial direction.

The elastic member forming section 71 of the large-diameter fitting section 61 has a base section 81, and an annular protrusion 82 protruding outward in the radial direction from the base section 81 from the central position of the base section 81 in the axial direction. The entire outer peripheral surface section 75 of the large-diameter fitting section 61 is the elastic member forming section 71. The outer peripheral surface section 75 includes a main outer peripheral surface 83 which is a cylindrical surface of the base section 81, a surface of the protrusion 82, and a tapered surface 85 of the base section 81 on the plane section 78 side in the axial direction.

As illustrated in FIG. 4, in the elastic member forming section 71 of the large-diameter fitting section 61, between the inner peripheral surface section 76 of the large-diameter fitting section 61 in the radial direction and the inner peripheral surface 93 of the metallic member 67, a notch 91 is formed to connect a part of the inner peripheral surface section 76 on the plane section 78 side in the axial direction and a part of the plane section 78 on the inner peripheral surface section 76 side in the radial direction. The notch 91 opens to the inner peripheral surface section 76 and is formed to be recessed outward in the radial direction from the main inner peripheral surface 92 which is the cylindrical surface of the inner peripheral surface section 76. The radially outer position of the notch 91 is a position of the inner peripheral surface 93 of the metallic member 67 or a position near the inner peripheral surface 93. When the notch 91 is formed up to the inner peripheral surface 93 of the metallic member 67, the inner peripheral surface 93 is exposed to the outside. When the notch 91 is formed up to a position in front of the inner peripheral surface 93, a layer of a thin elastic member forming section 71 is provided between the notch 91 and the inner peripheral surface 93.

The notch 91 opens to the plane section 78 and is recessed in the axial direction. The notch 91 is formed to extend from the plane section 78 beyond the end surface 94 of the metallic member 67 on the plane section 78 side. The large-diameter fitting section 61 includes a plurality of notches 91 which open inward in the disc radial direction and are formed in the disc axial direction, in an inner part of the large-diameter fitting section 61 in the radial direction with respect to the metallic member 67. As illustrated in FIG. 3, the plurality of notches 91 are formed at equal intervals in the circumferential direction of the large-diameter fitting section 61.

As illustrated in FIG. 4, the inner peripheral surface section 76 of the large-diameter fitting section 61 includes a main inner peripheral surface 92 and inner surfaces 95 of the plurality of notches 91.

Figure 6:
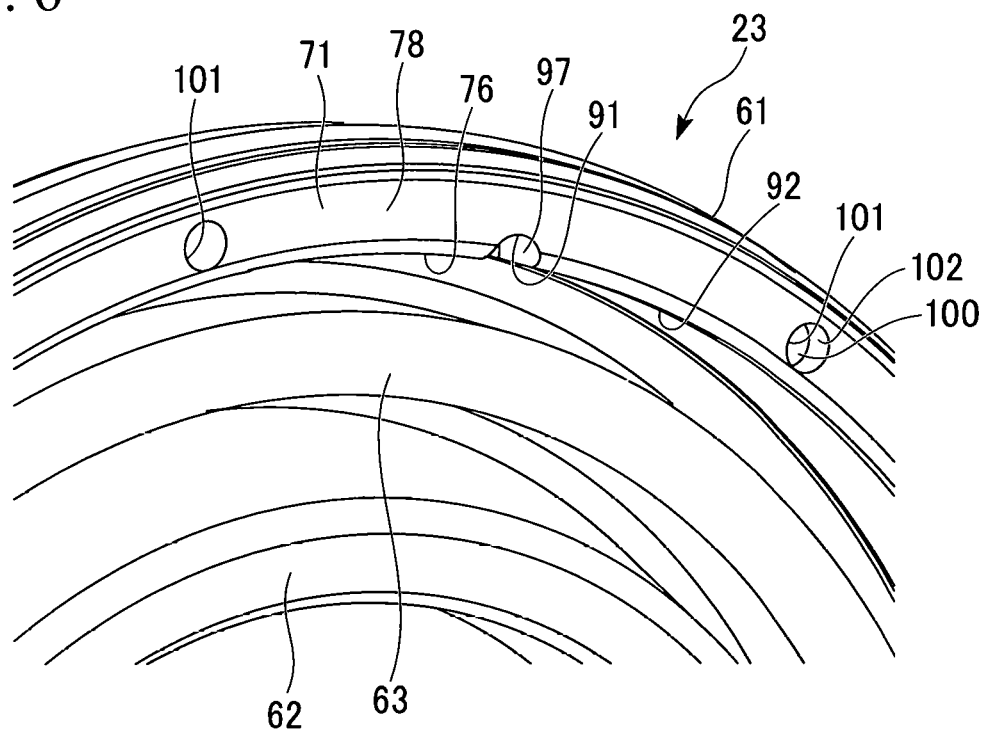
FIG. 6 is a partial perspective view illustrating the piston boot according to the embodiment of the present invention.

As illustrated in FIGS. 3 and 6, the notch 91 has a curved recessed surface 97 including a semicylindrical surface on the plane section 78 side. The notch 91 has an inclined surface 98 illustrated in FIG. 4 including a flat surface on the side of the curved recessed surface 97 opposite to the plane section 78. As illustrated in FIG. 6, the curved recessed surface 97 has a shape in which the peripheral width of the large-diameter fitting section 61 increases toward the main inner peripheral surface 92 side. As illustrated in FIG. 4, the inclined surface 98 is recessed so that the depth in the radial direction of the large-diameter fitting section 61 becomes shallower as it separates from the plane section 78. The curved recessed surface 97 is formed to extend from the plane section 78 to a position beyond the end surface 94 of the metallic member 67 on the plane section 78 side.

As illustrated in FIGS. 3 and 6, the elastic member forming section 71 of the large-diameter fitting section 61 is formed with a plurality of bottomed holes 101 having a bottom surface 100, the plurality of holes 101 recessed in the axial direction of the large-diameter fitting section 61 from the plane section 78 within the range of the plane section 78. As illustrated in FIG. 3, the plurality of holes 101 and the plurality of notches 91 are formed at different positions of the large-diameter fitting section 61 in the circumferential direction. Specifically, the plurality of holes 101 are disposed at equal intervals in the circumferential direction of the large-diameter fitting section 61 to be disposed one by one in the central position between the notches 91 adjacent in the circumferential direction of the large-diameter fitting section 61. Therefore, in the large-diameter fitting section 61, the notches 91 and the holes 101 are alternately disposed in the circumferential direction at equal intervals. In the present embodiment, as described above, the plurality of holes 101 and the plurality of notches 91 are formed at different positions of the large-diameter fitting section 61 in the circumferential direction. However, these are not necessarily different positions, and these peripheral positions may be identical positions.

As illustrated in FIG. 6, the holes 101 are circular holes having wall surfaces 102 including cylindrical surfaces. As illustrated in FIG. 5, the holes 101 are formed up to the position of the end surface 94 of the metallic member 67 on the plane section 78 side or the position near the end surface 94. When the holes 101 are formed up to the position of the end surface 94 of the metallic member 67, the bottom surface 100 of the holes 101 includes the end surface 94, and the end surface 94 is exposed to the outside by the holes 101. Further, when the holes 101 are formed to the position close to the end surface 94 of the metallic member 67, a thin layer of the elastic member forming section 71 is provided between the bottom surface 100 and the end surface 94.

The radial thickness of the portion aligned with the holes 101 in the circumferential direction of the metallic member 67 is thinner than the diameter of the holes 101. Further, the holes 101 are disposed in the radial direction of the metallic member 67 to traverse a portion of the metallic member 67 aligned with the holes 101 in the circumferential direction. Since it is within the range of the plane section 78, the plurality of holes 101 are located on the inner side in the radial direction from the outer peripheral surface section 75 of the large-diameter fitting section 61, and on the outer side in the radial direction from the main inner peripheral surface 92 of the inner peripheral surface section 76 of the large-diameter fitting section 61. In other words, in the plane section 78 of the large-diameter fitting section 61, the plurality of holes 101 having the bottom surface 100 open at the position of the end surface 94 of the metallic member 67 or the position in the vicinity of the end surface 94.

As illustrated in FIG. 2, the large-diameter fitting section 61 brings the annular outer peripheral surface section 75 into contact with the annular inner peripheral surface 42 of the stepped section 41, and brings the annular plane section 78 into contact with the annular wall surface section 43 of the stepped section 41, and the piston boot 23 is connected to the cylinder 26. At this time, the large-diameter fitting section 61 engages the protrusion 82 with the engagement groove 46. Therefore, the large-diameter fitting section 61 is positioned in the axial direction with respect to the stepped section 41, and is suppressed from being extracted from the stepped section 41. In such a positioned state, the large-diameter fitting section 61 is fitted into the stepped section 41 with interference in both the radial direction and the axial direction. As a result, the outer peripheral surface section 75 is brought into close contact with the inner peripheral surface 42 of the stepped section 41, and the plane section 78 is brought into close contact with the annular wall surface section 43 of the stepped section 41. At that time, the large-diameter fitting section 61 brings the outer peripheral surface section 75 into close contact with the inner peripheral surface 42 of the stepped section 41 to be continuous around the entire circumference, and brings the plane section 78 into close contact with the annular wall surface section 43 to be continuous around the entire circumference.

Further, the small-diameter fitting section 62 of the piston boot 23 is fitted into the locking groove 55 of the piston 21. At that time, the inner peripheral surface of the small-diameter fitting section 62 is brought into close contact with the bottom surface of the locking groove 55 to be continuous around the entire circumference. In this way, one end side of the piston boot 23 is connected to the cylinder 26, and the other end side of the piston boot 23 is connected to the piston 21.

In the disc brake 10 illustrated in FIG. 1, when the brake fluid is introduced into the bore section 30 of the cylinder 26 of the caliper 15 from the through hole 33, the brake pressure acts on the bottom section 51 of the piston 21. Then, the piston 21 advances toward the disc 11 side to push the pad 13 on the piston 21 side toward the disc 11. As a result, the pad 13 moves to come into contact with the disc 11. Further, the reaction force of the pressing causes the caliper body 20 of the caliper 15 to move, and the claw section 28 presses the pad 14 against the disc 11. As a result, the pad 14 comes into contact with the disc 11.

As described above, the caliper 15 clamps the pair of pads 13 and 14 from both sides by the piston 21 and the claw section 28 and presses the pair of pads 13 and 14 against the both surfaces of the disc 11 by the operation of the piston 21. As a result, the caliper 15 gives frictional resistance to the disc 11 to generate a braking force. In the piston boot 23, the bellows section 63 expands and contracts in accordance with a change in the distance between the large-diameter fitting section 61 and the small-diameter fitting section 62, in which the axial distance of which changes depending on the change in the protruding amount of the piston 21 from the bore section 30. As a result, the piston boot 23 always restricts adhesion of foreign matter on the outer peripheral portion exposed from the cylinder 26 on the side of the bottom section 51 from the locking groove 55 of the piston 21 and entry of foreign matter into the gap between the piston 21 and the bore section 30.

Figure 7:
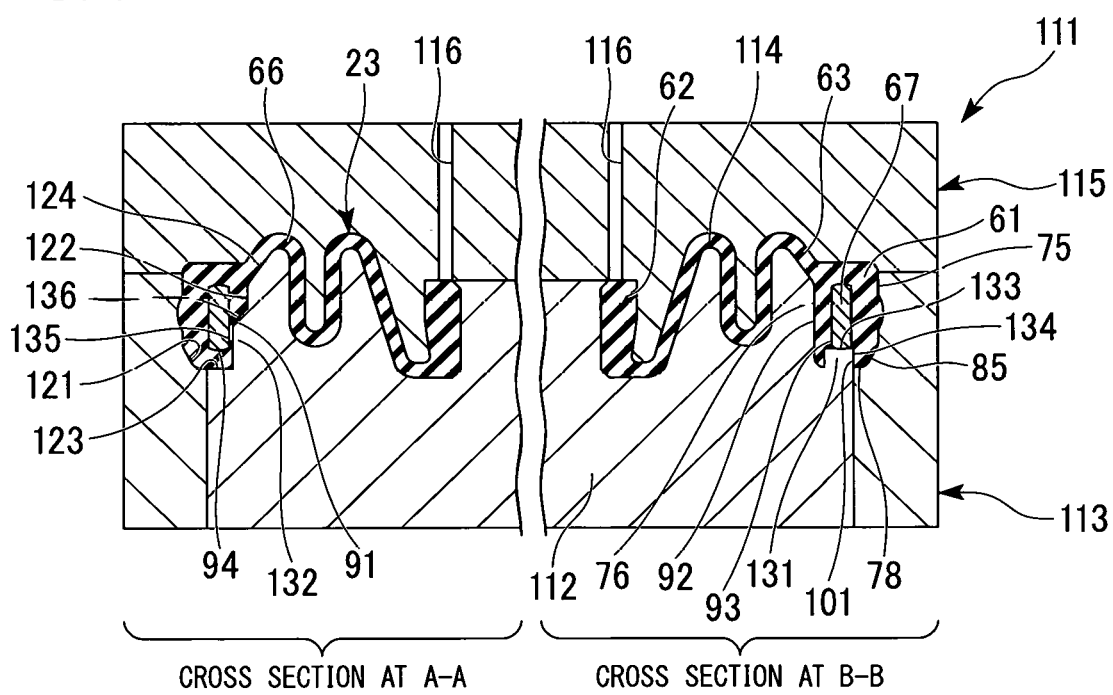
FIG. 7 is a cross-sectional view of a metal mold used for manufacturing the piston boot according to the embodiment of the present invention.

When the above-described piston boot 23 is manufactured, a metal mold 111 illustrated in FIG. 7 is used. The metal mold 111 has a lower metal mold 112 which supports the metallic member 67, a middle metal mold 113 in which the lower metal mold 112 in a state of supporting the metallic member 67 is set, and an upper metal mold 115 which forms a cavity 114 of the shape of the elastic member 66 together with the lower metal mold 112 and the middle metal mold 113. In the upper metal mold 115, a plurality of injection ports 116 for injecting an unvulcanized rubber material into the cavity 114 are formed. The method for manufacturing the piston boot 23 is not limited to a method for injecting the unvulcanized rubber material into the cavity 114 to perform vulcanization molding. For example, a method for charging the unvulcanized rubber material into the cavity 114 to perform the vulcanization molding (compression molding method) may be used.

Figure 8:
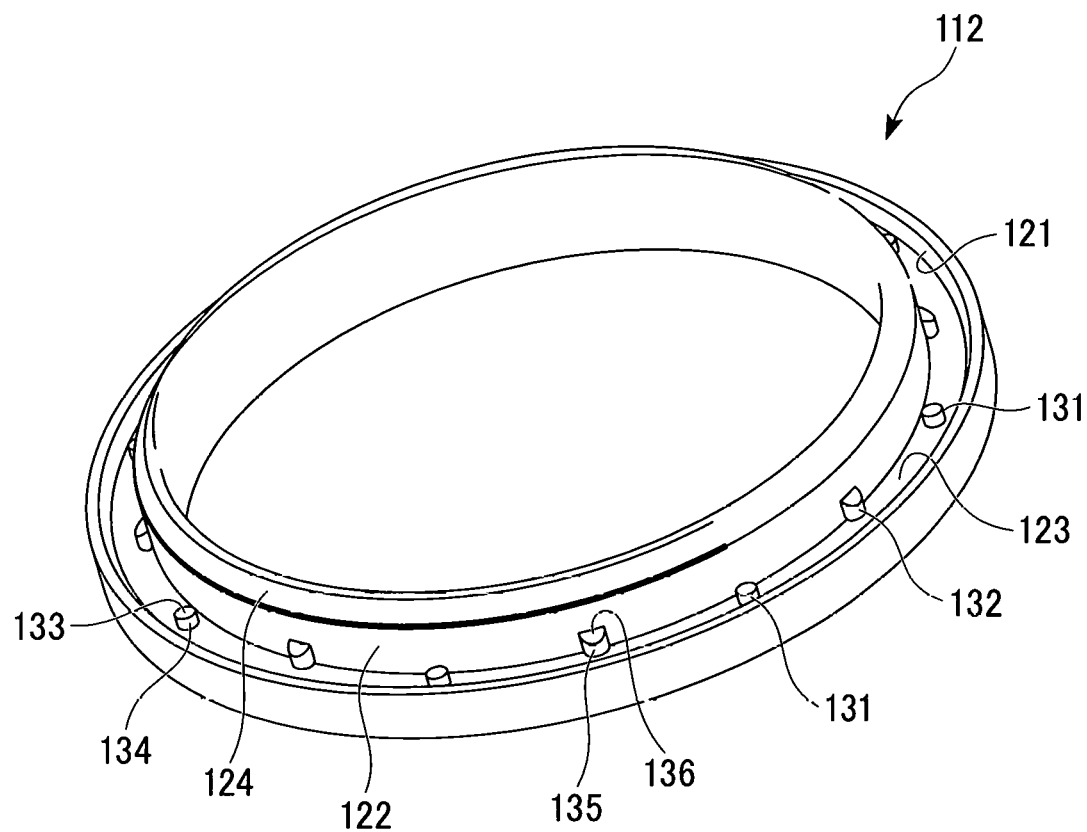
FIG. 8 is a perspective view illustrating a main part of the metal mold used for manufacturing the piston boot according to the embodiment of the present invention.

As illustrated in FIG. 8, the lower metal mold 112 has an annular shape. As illustrated in FIG. 7, the lower metal mold 112 has a formation surface 121 having a tapered surface for forming a tapered surface 85 of the outer peripheral surface section 75 of the large-diameter fitting section 61, a formation surface 122 having a cylindrical surface for forming the main inner peripheral surface 92 of the inner peripheral surface section 76 of the large-diameter fitting section 61, a formation surface 123 including a plane for forming the plane section 78, and a formation surface 124 for forming a part of the bellows section 63.

As illustrated in FIG. 8, a cylindrical axial support protrusion 131 protruding to the outer side in the axial direction from the formation surface 123 is formed in the inner range of the formation surface 123. At a boundary position between the formation surface 122 and the formation surface 123, a semi-columnar radial support protrusion 132 protruding to the outer side in the radial direction from the formation surface 122 and protruding to the outer side in the axial direction from the formation surface 123 is formed. A plurality of axial support protrusions 131 are formed at equal intervals in the circumferential direction of the lower metal mold 112. A plurality of radial support protrusions 132 are also formed at equal intervals in the circumferential direction of the lower metal mold 112. The plurality of axial support protrusions 131 are disposed one by one at the central position between the radial support protrusions 132 adjacent to each other in the circumferential direction of the lower metal mold 112. Therefore, in the lower metal mold 112, the axial support protrusions 131 and the radial support protrusions 132 are alternately arranged in the circumferential direction at equal intervals.

The radial support protrusion 132 has a formation surface 135 including a semi-cylindrical surface, and a formation surface 136 including a part of a conical surface having a certain point on the axial center as a vertex. The formation surface 135 is formed from the formation surface 123 to a position beyond the upper side of the axial support protrusion 131 as a whole, and the formation surface 136 is formed on the side of the formation surface 135 opposite to the formation surface 123. The formation surface 136 is inclined so that the height from the formation surface 122 in the radial direction of the lower metal mold 112 becomes lower as the formation surface 136 being away from the formation surface 123.

In the plurality of axial support protrusions 131, a leading end surface 133 on the side opposite to the formation surface 123 is parallel to the formation surface 123, and the respective heights from the formation surfaces 123 to the leading end surface 133 are matched. Each of the plurality of axial support protrusions 131 has a cylindrical outer peripheral surface 134. The metallic member 67 is placed on the leading end surface 133 of the axial support protrusion 131. As a result, the plurality of axial support protrusions 131 support the metallic member 67 in the axial direction and position the metallic member 67 in the axial direction with respect to the lower metal mold 112. The plurality of radial support protrusions 132 have the lowest height from the formation surface 123 of each formation surface 135 higher than the axial support protrusion 131. The plurality of radial support protrusions 132 are fitted to the inner side of the metallic member 67 placed on the plurality of axial support protrusions 131, and support the metallic member 67 in its radial direction and position the metallic member 67 relative to the lower metal mold 112 in the radial direction.

Here, when the metallic member 67 is fitted to the plurality of radial support protrusions 132, the formation surface 136 of the plurality of radial support protrusions 132 secures a gap between the formation surface 136 and the metallic member 67 toward the front side in the fitting direction to make insertion easier. Thereafter, the formation surface 135 of the plurality of radial support protrusions 132 are fitted to the metallic member 67 and position the metallic member 67 in the radial direction of the lower metal mold 112. In this manner, the metallic member 67 disposed in the middle metal mold 113 together with the lower metal mold 112 in the state of being set on the lower metal mold 112 is positioned axially and radially with respect to the cavity 114 formed by the upper metal mold 115 set on the middle metal mold 113, the lower metal mold 112, and the middle metal mold 113.

The unvulcanized rubber material is injected from a plurality of injection ports 116 into the cavity 114 in which the metallic member 67 is set to fill the inside of the cavity 114 with the unvulcanized rubber material. Thereafter, the unvulcanized rubber material is vulcanized and formed into the elastic member 66. As a result, the piston boot 23 in which the metallic member 67 is embedded in the elastic member forming section 71 of the elastic member 66 is completed. At that time, the formation surface 121 of the lower metal mold 112 forms a tapered surface 85. The formation surface 122 of the lower metal mold 112 forms the main inner peripheral surface 92. The formation surface 123 of the lower metal mold 112 forms a plane section 78. The axial support protrusion 131 of the lower metal mold 112 forms the hole 101. The radial support protrusion 132 of the lower metal mold 112 forms the notch 91.

Here, when the unvulcanized rubber material is injected into the cavity 114, if there is no gap between the formation surface 135 of the radial support protrusion 132 and the inner peripheral surface 93 of the metallic member 67, the notch 91 is formed from the main inner peripheral surface 92 to the position of the inner peripheral surface 93 of the metallic member 67. On the other hand, if a gap is generated between the formation surface 135 of the radial support protrusion 132 and the inner peripheral surface 93 of the metallic member 67 due to the pressure of the rubber or the like, the notch 91 is formed from the main inner peripheral surface 92 to a position near the inner peripheral surface 93 of the metallic member 67.

Similarly, when there is no gap between the leading end surface 133 of the axial support protrusion 131 and the end surface 94 of the metallic member 67 at the time of injecting the unvulcanized rubber material into the cavity 114, the hole 101 is formed from the plane section 78 to the position of the end surface 94 of the metallic member 67. On the other hand, if a gap is generated between the leading end surface 133 of the axial support protrusion 131 and the end surface 94 of the metallic member 67 due to the pressure of rubber or the like, the hole 101 is formed from the plane section 78 to the position near the end surface 94 of the metallic member 67.

The plurality of holes 101 of the piston boot 23 are portions formed by a plurality of axial support protrusions 131. The plurality of notches 91 of the piston boot 23 are portions formed by the plurality of radial support protrusions 132. The bottom surface 100 of the hole 101 is formed by the leading end surface 133 of the axial support protrusion 131. The wall surface 102 is formed by the outer peripheral surface 134 of the axial support protrusion 131. The curved recessed surface 97 of the notch 91 is formed by the formation surface 135 of the radial support protrusion 132. The inclined surface 98 is formed by the formation surface 136.

The technique described in Patent Document 1 uses a piston boot having a structure in which an annular metallic member is buried in an annular end portion of an elastic body, as a piston boot to be installed between the piston and the cylinder. In the case of manufacturing this piston boot, the metallic member is supported in the axial direction and the radial direction by two support surfaces of the L-shaped support section provided in the metal mold. In order to prevent foreign matter from entering from the notch remaining as a mark of such a support section, a whisker-like lip section is formed in the piston boot. However, when the lip section is formed, the area of the support surface that supports the metallic member of the metal mold in the axial direction cannot be sufficiently secured. Therefore, it is necessary to carefully set the metallic member so as not to cause dropout in the set to the metal mold, and it takes a long working time and the productivity may decline. Therefore, the cost of the piston boot increases, which increases the cost of the disc brake.

Further, since the support section of the metal mold for molding the piston boot has an L-shape, the shape is complicated and the manufacturing cost increases. Therefore, the cost of the piston boot increases, which increases the cost of the disc brake.

Also, when the piston boot is press-fitted into the cylinder, the lip section first comes into contact with the cylinder. This lip section is easily deformed and how it deforms in its bending direction is unstable. For this reason, when the piston boot is press-fitted and fixed to the cylinder, it is necessary to check whether the lip section does not bend in a prescribed direction and not to be a defective assembly, which lowers productivity. There is also a possibility that the lip section may be damaged at the time of press-fitting. When the lip section is damaged, it is necessary to perform assembling again, which lowers productivity. In this way, there is a possibility that the productivity is lowered due to the lip section. Therefore, the cost of the disc brake is increased.

In contrast, in the piston boot 23 of the embodiment, the annular large-diameter fitting section 61 containing the annular metallic member 67 comes into contact with the inner peripheral surface 42 of the stepped section 41 at the outer peripheral surface section 75, and comes into contact with the annular wall surface section 43 of the stepped section 41 at the annular plane section 78. This results in a shape that does not have a lip section that comes into contact with the annular wall surface section 43 of the stepped section 41. Therefore, it is possible to suppress a decrease in productivity caused by the lip section. Accordingly, it is possible to suppress an increase in the cost of the disc brake 10. Moreover, since the large-diameter fitting section 61 comes into contact with the inner peripheral surface 42 of the stepped section 41 at the outer peripheral surface section 75 and comes into contact with the annular wall surface section 43 of the stepped section 41 at the annular plane section 78, the assembly to the cylinder 26 is stabilized and the assembly quality can be improved.

A plurality of holes 101 having a bottom surface 100 at a position of the metallic member 67 or a position near the metallic member 67 are opened in the annular plane section 78. Thus, the axial support protrusion 131 of the lower metal mold 112, which leaves the plurality of holes 101 as a trace, can increase the area for supporting the metallic member 67. Therefore, it is possible to suppress a decrease in productivity due to insufficient support area. Accordingly, it is possible to suppress the cost increase of the piston boot 23, which can suppress an increase in the cost of the disc brake 10.

In the large-diameter fitting section 61, a plurality of notches 91 notched in the radial direction (disc radial direction) of the metallic member 67 are formed on an inner side in the radial direction (inner side in the disc radial direction) of the metallic member 67 than the metallic member 67. These notches 91 are formed at different positions in the circumferential direction of the large-diameter fitting section 61 with respect to the plurality of holes 101.

Therefore, in the lower metal mold 112, the axial support protrusion 131 that leaves the hole 101 as a mark, and the radial support protrusion 132 that leaves the notch 91 as a mark are formed at different positions in the circumferential direction. Therefore, the shapes of the axial support protrusion 131 and the radial support protrusion 132 are simplified to facilitate the formation, and can suppress the increase in the cost of the lower metal mold 112. Therefore, the cost increase of the piston boot 23 can be suppressed, which can suppress an increase in the cost of the disc brake 10.

Although the disc brake 10 of the embodiment described above includes the piston 21 which presses one of the pair of pads 13 and 14, the disc brake 10 may include a piston that presses both pads 13 and 14 of the pair of pads 13 and 14. In other words, the disc brake 10 may have a piston that presses at least one pad of the pair of pads.

The disc brake and the piston boot according to the embodiment described above may be of the type described below, for example.

A disc brake according to a first aspect of the present invention includes a piston which presses at least one of a pair of pads facing each other on both sides of a disc; a cylinder having a bore which movably accommodates the piston and has one open end from which a leading end of the piston protrudes, a stepped section having an inner diameter larger than an inner diameter of the bore section being formed on an opening side of the bore section; and a piston boot which is disposed between a leading end side of the piston and the stepped section of the cylinder and has a bellows section capable of expanding and contracting with the movement of the piston, wherein the piston boot has an annular fitting section which is formed on one end side of the bellows section, encloses an annular metallic member and is fitted to the stepped section, the fitting section includes an outer peripheral surface section which comes into contact with an inner peripheral surface of the stepped section, and an annular plane section which comes into contact with the annular wall surface section of the stepped section, and a plurality of holes having a bottom surface at a position of the metallic member or a position near the metallic member are opened to the plane section, respectively.

A piston boot as a second aspect is a piston boot which is disposed between a leading end side of a piston provided in a caliper of a disc brake and a stepped section formed in a cylinder opening of the caliper, and has a bellows section capable of expanding and contracting with movement of the piston, wherein the piston boot has an annular fitting section which is formed on one end side of the bellows section, encloses an annular metallic member and is fitted to the stepped section, the fitting section has an outer peripheral surface section which comes into contact with an inner peripheral surface of the stepped section, and an annular plane section which comes into contact with an annular wall surface section of the stepped section, and a plurality of holes each having a bottom surface at a position of the metallic member or a position near the metallic member are opened to the plane section. Therefore, the piston boot has a shape which does not have a lip section that comes into contact with the annular wall surface section of the stepped section. Therefore, it is possible to suppress a decrease in productivity caused by the lip section. Therefore, it is possible to suppress an increase in the cost of the disc brake.

According to the disc brake as a third aspect of the present invention, in the first aspect, the fitting section has a plurality of notches, which are open inward in a disc radial direction and are formed along a disc axial direction, in a part on an inner side in the disc radial direction from the metallic member.

According to the disc brake as a fourth aspect of the present invention, in the third aspect, a radially outer position of the notch is located at a position of the inner peripheral surface of the metallic member or a position near the inner peripheral surface of the metallic member.

According to the disc brake as a fifth aspect of the present invention, in the third or fourth aspect, the plurality of holes and the notches are formed at different positions in a circumferential direction of the fitting section.

According to the piston boot as a sixth aspect of the present invention, in the second aspect, the fitting section is provided with a notch which are opened to the inner peripheral surface of the fitting section and is recessed outward in the radial direction, between the inner peripheral surface of the fitting section and the metallic member.

According to the piston boot as a seventh aspect of the present invention, in the sixth aspect, a radially outer position of the notch is located at a position of the inner peripheral surface of the metallic member or a position near the inner peripheral surface of the metallic member.

According to the piston boot as an eighth aspect of the present invention, in the sixth or seventh aspect, the plurality of holes and the notches are formed at different positions in the circumferential direction of the fitting section. Therefore, the shape of the portion for forming the plurality of holes of the metal mold and the shape of the portion for forming the notch are simplified to facilitate the formation, and it is possible to suppress the cost increase of the metal mold. Therefore, it is possible to suppress the cost increase of the piston boot, which can suppress the increase in the cost of the disc brake.

In the embodiment described above, an example in which a rubber material is used as the elastic member is illustrated, but a resin material may be used as the elastic member.

INDUSTRIAL APPLICABILITY

According to the disc brake and the piston boot described above, an increase in cost can be suppressed.

REFERENCE SIGNS LIST

10 Disc brake
11 Disc
13,14 Pad
15 Caliper
21 Piston
23 Piston boot
26 Cylinder
30 Bore section
41 Stepped section
42 Inner peripheral surface
43 Annular wall surface section
63 Bellows section
67 Metallic member
61 Large-diameter fitting section (fitting section)
75 Outer peripheral surface section
78 Plane section
91 Notch
100 Bottom section
101 Hole

The invention claimed is:

1. A disc brake comprising:
a piston which presses at least one of a pair of pads facing each other on both sides of a disc;
a cylinder having a bore which movably accommodates the piston and has one open end from which a leading end of the piston protrudes, and a stepped section having an inner diameter larger than an inner diameter of the bore formed on an opening side of the bore; and
a piston boot which is disposed between a leading end side of the piston and the stepped section of the cylinder and has a bellows section capable of expanding and contracting with the movement of the piston,
wherein the piston boot has an annular fitting section which is formed on one end side of the bellows section, encloses an annular metallic member and is fitted to the stepped section,
wherein the fitting section includes an outer peripheral surface section which comes into contact with an inner peripheral surface of the stepped section, and an annular plane section which comes into contact with an annular wall surface section of the stepped section,
wherein the fitting section includes a plurality of holes having a bottom surface at a position of the metallic member or a position near the metallic member open to the plane section,
wherein the fitting section has a plurality of notches that open inward in a disc radial direction and are formed along a disc axial direction in a part on an inner side in the disc radial direction with respect to the metallic member,
wherein the stepped section is provided with an engagement groove,
wherein the outer peripheral surface of the fitting section is provided with a protrusion, and
wherein the protrusion is configured to be engaged with the engagement groove, thereby the fitting section is positioned in the axial direction with respect to the stepped section.

2. The disc brake according to claim 1, wherein radially outer positions of the plurality of notches are located at positions of an inner peripheral surface of the metallic member or positions near the inner peripheral surface of the metallic member.

3. The disc brake according to claim 1, wherein the plurality of holes and the plurality of notches are formed at different positions in a circumferential direction of the fitting section.

4. A piston boot which is disposed between a leading end side of a piston provided in a caliper of a disc brake and a stepped section formed in a cylinder opening of the caliper, and has a bellows section capable of expanding and contracting with movement of the piston,
wherein the piston boot has an annular fitting section which is formed on one end side of the bellows section, encloses an annular metallic member and is fitted to the stepped section,
wherein the fitting section has an outer peripheral surface section which comes into contact with an inner peripheral surface of the stepped section, and an annular plane section which comes into contact with an annular wall surface section of the stepped section,
wherein the fitting section includes a plurality of holes each having a bottom surface at a position of the metallic member or a position near the metallic member open to the plane section, and wherein notches that are recessed outward in the radial direction from an inner peripheral surface of the fitting section are provided in the fitting section, wherein the notches are formed in a region from the inner peripheral surface of the fitting section to the metallic member, wherein the stepped section is provided with an engagement groove, wherein the outer peripheral surface of the fitting section is provided with a protrusion, and wherein the protrusion is configured to be engaged with the engagement groove, thereby the fitting section is positioned in the axial direction with respect to the stepped section.

5. The piston boot according to claim 4, wherein radially outer positions of the notches are located at positions of the inner peripheral surface of the metallic member or positions near the inner peripheral surface of the metallic member.

6. The piston boot according to claim 4, wherein the plurality of holes and the notches are formed at different positions in a circumferential direction of the fitting section.

\* \* \* \* \*